United States Patent [19]

Yazdzik, Jr. et al.

[11] Patent Number: 5,430,936

[45] Date of Patent: Jul. 11, 1995

[54] METHOD FOR MAKING GAS TURBINE ENGINE BLADE ATTACHMENT SLOTS

[75] Inventors: Henry Yazdzik, Jr., Rocky Hill; Gordon M. Reed, Plantsville, both of Conn.; Vernon E. Estes, Carlisle, Pa.; Herbert L. Walker, Glastonbury, Conn.

[73] Assignee: United Technologies Corporation, Hartford, Conn.

[21] Appl. No.: 172,958

[22] Filed: Dec. 27, 1993

[51] Int. Cl.⁶ ............................................. B23P 15/00
[52] U.S. Cl. ................................. 29/889.2; 29/558; 409/244; 451/54; 451/55; 451/57
[58] Field of Search ............. 409/244; 51/281 R, 326, 51/327, 291, 323; 20/889.2, 557, 558; 451/54, 55, 57

[56] References Cited

U.S. PATENT DOCUMENTS

| | | | |
|---|---|---|---|
| 3,341,918 | 9/1967 | Mansfield et al. | 409/244 |
| 3,988,866 | 11/1976 | Booher, Jr. | 51/323 |
| 4,294,568 | 10/1981 | Lipowsky et al. | 409/244 |
| 4,505,075 | 3/1985 | Salmon et al. | 29/889 |
| 4,512,115 | 4/1985 | Miller | 29/889.2 |
| 4,537,538 | 8/1985 | Mitamura et al. | 409/217 |
| 4,566,225 | 1/1986 | Bizot et al. | 29/889.2 |
| 4,692,976 | 9/1987 | Andrews | 29/156.8 |
| 4,924,637 | 5/1990 | Ikimi et al. | 51/327 |
| 5,141,401 | 8/1992 | Juenger et al. | 416/219 R |
| 5,152,669 | 10/1992 | Heinig et al. | 416/219 R |
| 5,176,480 | 1/1993 | Kelm | 409/244 |

FOREIGN PATENT DOCUMENTS

| | | | |
|---|---|---|---|
| 2627309 | 12/1977 | Germany | 29/889.2 |
| 0142026 | 6/1986 | Japan | 29/889 |

OTHER PUBLICATIONS

Antwerp, Catherine Van, CNC Grinding of Flat Broaches, Technical Paper, Society of Manufacturing Engineers 1990, 10 pgs.

Letter to Pratt & Whitney dated Oct. 3, 1991 from Baltz Kloeti of Maegerle, Inc., re: Rough grinding of slots in turbine discs, 10 pgs.

*Primary Examiner*—Irene Cuda
*Attorney, Agent, or Firm*—Charles E. Sohl

[57] ABSTRACT

Blade attachment slots for gas turbine engines are prepared by grinding to a stepped, generally straight sided configuration, semi-finish grinding to an envelope about 0.005 inches to 0.010 inches above the blueprint configuration, and finishing by broaching. This reduces the overall cost of the manufacturing process, permits a more economical use of existing broach machines, and allows greater versatility for short model runs and "just-in-time" production.

10 Claims, 1 Drawing Sheet

METHOD FOR MAKING GAS TURBINE ENGINE BLADE ATTACHMENT SLOTS

TECHNICAL FIELD

This invention, deals with the production of components for gas turbine engines, and more specifically with the making of blade attachment slots in compressor and turbine disks.

BACKGROUND ART

Gas turbine engine disks commonly have slots for attaching blades which are generally axially oriented. These slots have a profile which mates with the roots of the blades, and have a configuration which will retain the blades in the slots under the applied centrifugal forces incurred in operation of the engine. The slot profiles are often of a "fir-tree" configuration to increase the load bearing area in the slot, although other configurations are also employed.

The almost universally employed method for making these slots in the disks is broaching, a process in which a series of progressively differently shaped cutters is mounted on a rack which is pulled through the workpiece. Each cutter is slightly different from the previous cutter, and is designed to gradually remove material in a manner which eventually creates the finished profile of the slot.

As gas turbine engines have become larger and more powerful, the slots in the disks have become larger and deeper, and the materials employed have become tougher and more difficult to machine. Broaching of the slots requires a greater number of cutters, and consequently a greater length of travel for the cutter bars in order to remove the required amount of material. In many instances, the cutter bar length requirement is greater than the capacity of the machines on hand, and to add new capability sufficient to meet the new requirements would be cost-prohibitive.

It has also been found that, with some materials which work harden, the material can be hardened sufficiently during the early stages of the broaching operation that cutter wear becomes excessive on the later, finishing cutters. This can be very detrimental to surface finish in the slots. In some cases, the forces generated during the later broaching stages are so high that the material on either side of the slot is deflected, resulting in dimensional deviations in the slot shape, or in extreme cases, the material separating the slots can be permanently deformed.

The setup of a broaching machine for the machining of a particular part can be a time-consuming and costly operation. Since the broaching of the slots in a disk usually requires the entire capacity of the machine, it is necessary to tear down and re-tool a broaching machine every time a part having a different slot configuration is to be machined. These factors work in opposition to the current trends toward "just-in-time" delivery of component parts, and to the processing of small lots of parts in response to short model runs.

Our invention (1) provides a process for making blade attachment slots which reduces the dependence on broaching, (2) reduces the time required to machine the slots, and (3) increases the flexibility of the operation.

DISCLOSURE OF INVENTION

The process of this invention involves the grinding of a rough slot, which is generally straight sided, followed by a near net shape grinding operation to remove material in the general configuration of the slot down preferably to within about 0.005 inches to 0.010 inches of the finished slot dimension, with finishing of the slot by broaching.

The initial rough grinding operation is carried out by a vitrified wheel or an electroplated abrasive wheel. The near net shape grinding is performed using a specially designed wheel. The wheel is cup shaped with the desired slot profile on the periphery of the wheel. Either a single or a double cup configuration can be used, although the double cup wheel has been found to be generally more rigid. The cutting profile of the wheel is covered with particles of abrasive material held in position by a layer of electroplated metal.

The overall configuration of the wheel is such that the rim of the wheel, which carries the profiled cutting surface, can fit down into the rough ground slot, from which position the profile can be ground into the sides and bottom of the rough slot. The diameter of the grinding wheel is large enough that, as the wheel is traversed from one side of the disk to the other, the inner surface of the periphery of the grinding wheel does not contact the disk.

After semi-finish grinding of one side of all the slots, the opposite sides of the slots are profile ground by repositioning the grinding wheel so that the same cutting surface faces the opposite side of the slot. In this manner the entire semi-finish grinding operation is performed with a single machine setup.

After completion of the profile grinding operation, the slots are finished to the required dimensions by broaching. Broaching is presently necessary to achieve the desired final surface integrity in the slots. The elimination of the early broaching stages means that multiple sets of finishing broaches can be installed on a single machine, thus eliminating the necessity of re-tooling for each different disk slot configuration.

Other operations, or combinations of operations, could be used to finish machine the slots, depending on the cost and time considerations. It is anticipated that improvements in grinding technology may eventually make that process capable of meeting the surface finish requirements.

BEST MODE FOR CARRYING OUT THE INVENTION

The essential aspect of this invention is a grinding process for the removal of the bulk of the material during the making of a gas turbine engine blade attachment slot.

Figure 1:
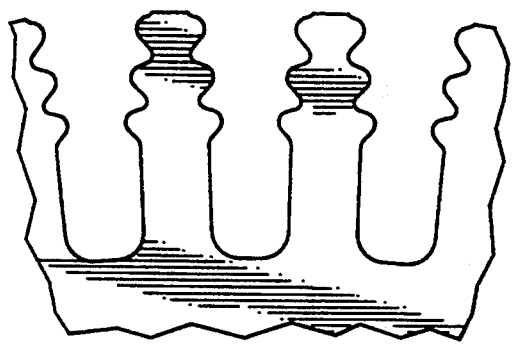
FIG. 1 is a front view of a portion of a typical turbine disk showing christmas tree slots.
Figure 5:
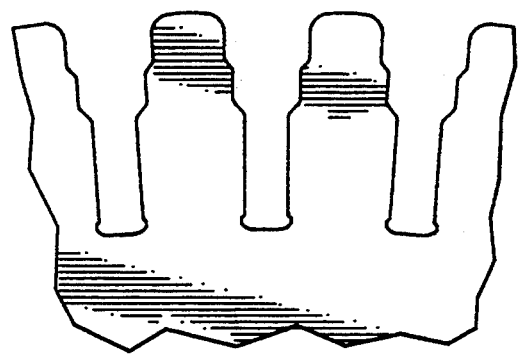
FIG. 5 shows a rough ground turbine disk with stepped slots.

A typical gas turbine engine disk is illustrated in FIG. 1. The slots in the rim of the disk are designed to mate with the root portion of the turbine blades in a manner which provides adequate resistance to the centrifugal forces encountered as the disk spins during engine operation. While the slots are frequently cut at an angle to the axis of the disk, the path of the slots is straight, and consequently ideally suited to the broaching operation. This straight path is also readily ground. FIG. 5 shows a rough ground turbine disk. The slots of FIG. 5 are triple stepped.

The rough grinding operation removes enough material to eliminate a large number of broach cutters generally used to produce the same configuration, and to provide a slot which will accept the semi-finish grinding wheel configuration. The semi-finish operation removes material down to preferably within about a 0.005 inch to 0.010 inch envelope of the required blueprint configuration.

A typical machine suitable for these grinding operations holds the disk in position and the rough or semi-finish wheel mounted on a spindle. The same, or a similar, machine is used for the rough grinding operation. This use of the same machine means that both the rough and semi-finish operations could be performed using the same tooling setup for the disk, with only a change of grinding wheels required.

Figure 2:
FIG. 2 shows the cross sectional view of the straight sided rough grinding wheel.

A cross section of the rough grinding wheel is a typical straight sided wheel. FIG. 2 shows a rough grinding wheel in step form. The rough grinding wheels also may be a wheel design with sloped sides. This would remove even more material than the straight sided wheel, and reduce the grinding requirements for the semi-finishing operation. This would likely reduce the grinding time required for the semi-finish operation, with little or no increase in the time required for the roughing operation.

The tool path followed by the rough grinding wheel is along the center line and situated just outside the edge of the disk. The wheel is plunged straight into the disk. The wheel is then traversed across the disk to complete the roughing operation. This is a more efficient path than traversing the wheel across the disk without the plunge.

A semi-finish grinding wheel has a relatively thin web and a flange or rim emanating from the outer edge of the web in such a manner that a double cup configuration is formed. In this instance, the rim is essentially perpendicular to the web. The peripheral surface of the rim is configured such that the application of this rim to the workpiece will result in the desired blade holding configuration in a slot in a disk. The peripheral surface of the rim is covered with abrasive particles in the region which will form the blade holding configuration. The abrasive particles are, e.g., diamond or cubic boron nitride (CBN), and are held in position on the surface of the wheel by a layer of electroplated metal.

The importance of this double cup configuration is threefold: (1) the abrasive surface is displaced from the web of the wheel so that the wheel is capable of clearing the workpiece in the center, or attachment, portion of the wheel, (2) two configured grinding surfaces provide additional use time for the wheel, and (3) the second cup on the opposite side of the web adds significantly to the stiffness of the wheel.

Figure 3:
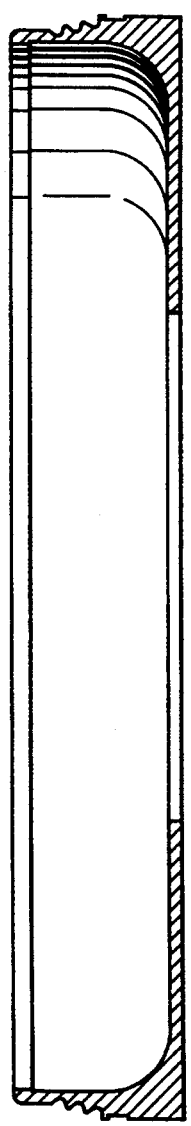
FIG. 3 shows a cross sectional view of a single cup semi-finish grinding wheel.
Figure 4:
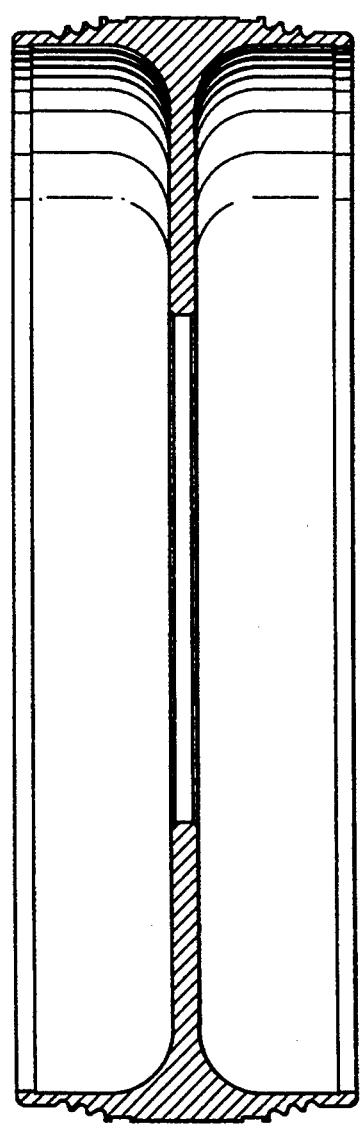
FIG. 4 shows a cross sectional view of a double cup semi-finish grinding wheel.

The tool path of the single cup wheel of FIG. 3 or the double cup wheel of FIG. 4, after positioning of the wheel, is the approximate center of the rough ground slot. The wheel is plunged into the side wall of the slot to a depth which leaves about 0.005 inches of excess material over the desired semi-finish ground dimension. The wheel is then traversed to one side of the disk and back to the other side of the disk.

The grinding wheel is then plunged the rest of the way to the desired envelope of the semi-finish ground slot, and traversed across the entire thickness of the disk. The wheel is then withdrawn slightly toward the center of the slot, and raised to remove the wheel from the slot.

Both sides of the slot can be ground using the same grinding wheel profile by simply translating the wheel so that its opposite edge is located at the slot. This will assure that the grinding of the slots is balanced. The double cup grinding wheel may also be reversed, in which case the opposite side of the configured rim will be utilized, thus extending the useful life of the grinding wheel.

An alternate configuration of the double cup grinding wheel is a "Y" shape. In this case the rim of the wheel is flared so that a cross-section of the double cup configuration assumes a "Y" shape. The tool path for this configuration will be similar to that for the wheel of FIG. 4, but the disk will be oriented in a different position in order that the wheel enters the slot and grinds the slot profile properly. An advantage of this wheel is that additional workpiece clearance is created because the center of the wheel, and the required wheel mounting hardware, will be further from the rim of the disk.

The invention will be better understood by reference to the following illustrative examples.

EXAMPLE I

A test sample representing the first stage turbine disk for a gas turbine engine was machined to simulate the production process for the blade attachment slots. The material has a nominal composition of 12% Cr, 18% Co, 3.2% Mo, 4.3% Ti, 5.0% Al, 0.18% V, 0.02% B, 0.06% Zr, balance Ni, with all quantities expressed in weight percent.

The rough slot was ground using a 20-inch diameter wheel. Grinding was done as a continuous dress creep feed operation with a wheel speed of 5500 SFM. The plunge portion was done at a rate of five inches per minute, and the wheel was traversed through the slot at a rate of 30 inches per minute. The actual cutting time amounted to a total of 22 seconds.

The semi-finish step was performed using a 16.5 inch diameter wheel with an electroplated CBN Type 500 abrasive grit coating as described above, and having a grit size of 170/200. Wheel speed was 8,500 SFM, and the wheel was plunged into the slot at 0.2 inches per minute and traversed at a rate of 5.0 inches per minute. Total cutting time was 2 minutes 12 seconds.

A total of 70 slots were semi-finish machined in this manner. The slots had excess material relative to the blueprint configuration which ranged from 0.007 to 0.010 inches.

In this Example, the slots were not finished to blueprint dimensions by broaching. We would use conventional finish broaches to complete the slots. Preferably, only one broach cutter is needed.

EXAMPLE II

A second test sample similar to that in Example I was made in a similar manner. However, in this test the rough slot was ground using a wheel with an electroplated CBN Type 500 grit abrasive coating as described above, and having a grit size of 100/120. Wheel speed was 24,000 SFM, and the wheel was plunged into the slot at 1.18 inches per minute and traversed at a rate of 7.87 inches per minute. Total cutting time was 90 seconds.

A total of 104 slots were rough machined in this manner. The semi-finish step, which was not performed for this test, would be conducted as in Example I. As in Example I, a conventional finish broaching would finish these slots to the final blueprint configuration.

We claim:

1. A method for producing a gas turbine engine blade attachment slot in a disk comprising:
   a. grinding a rough slot in the disk, the rough slot having stepped, generally straight sides by:
      plunging a straight sided grinding wheel into an outside edge of the disk to a desired depth;
      operating the grinding wheel to create the rough slot by traversing the wheel across the disk to complete a roughing operation; and
   b. grinding a semi-finished slot into the rough slot, the semi-finished slot having a profile generally similar to that of a finished slot by:
      plunging a semi-finish grinding wheel having a configured grinding surface into the rough slot;
      operating the grinding wheel to configure the rough slot by traversing the wheel from one side of the disk and back to another side of the disk; and
      repeating the plunging and traversing until the semi-finished slot is completed; and
   c. broaching the semi-finished slot to produce the finished slot.

2. A method of producing a gas turbine engine blade attachment slot in a disk comprising:
   a. grinding a rough slot having stepped, generally straight sides approximately along a center line of the disk by:
      positioning a straight sided grinding wheel on an outside edge of the disk;
      plunging the grinding wheel straight into the disk to a desired depth;
      traversing the grinding wheel across the disk to create the rough slot; and
      repeating the plunging and traversing until a desired stepped, straightened sided rough slot is completed;
   b. grinding a semi-finished slot into the rough slot, the semi-finished slot having a profile generally similar to that of a finished slot by:
      positioning a semi-finish grinding wheel having a configured peripheral surface on a rim thereof above the rough slot,
      plunging the semi-finish grinding wheel into the rough slot to a step along a center line of the disk, and
      traversing the semi-finish grinding wheel from side to side of the rough slot, and
      repeating the plunging and traversing at each step of the rough slot until the semi-finished slot is completed; and
   c. broaching the semi-finished slot to produce the finished slot.

3. A method for producing a gas turbine engine blade attachment slot in a disk comprising:
   a. grinding a rough slot in the disk, the rough slot having generally straight sides;
   b. grinding a slightly undersized semi-finished slot into the rough slot, the semi-finished slot having a profile generally similar to that of a finished slot; and
   c. broaching the semi-finished slot to produce the finished slot.

4. The method as recited in claim 3, wherein the broaching of step c is carried out by a plurality of finish cutting edges for widening and shaping a previously formed semi-finished slot.

5. The method as recited in claim 3, wherein the broaching of step c is carried out with only one finishing cutting edge for widening and shaping a previously formed semi-finished slot.

6. The method as recited in claim 3, wherein step b is carried out by using a grinding wheel having a desired semi-finish slot profile on a periphery of the grinding wheel, wherein the periphery of the grinding wheel also has an inner surface, wherein the inner surface does not contact the disk during the grinding of step b.

7. The method as recited in claim 3, wherein step b is carried out by using a cup-shaped grinding wheel having a desired semi-finished slot profile on a periphery of the grinding wheel.

8. The method as recited in claim 3, wherein step b is carried out by using a double cup-shape grinding wheel having a desired semi-finished slot profile on a periphery of the grinding wheel.

9. The method as recited in claim 3, wherein the grinding wheel has a layer of electroplated metal to bond abrasive material to the wheel.

10. The method as recited in claim 3, wherein the profile of the semi-finished slot is within about 0.005 inches and 0.010 inches of the finished slot.

* * * * *